UNITED STATES PATENT OFFICE.

CARLETON ELLIS, OF LARCHMONT, NEW YORK, ASSIGNOR TO CHADELOID CHEMICAL COMPANY, OF NEW YORK, N. Y., A CORPORATION OF WEST VIRGINIA.

FINISH-REMOVING PROCESS.

1,014,752. Specification of Letters Patent. Patented Jan. 16, 1912.

No Drawing. Application filed November 29, 1907. Serial No. 404,300.

*To all whom it may concern:*

Be it known that I, CARLETON ELLIS, a citizen of the United States, and resident of Larchmont, in the county of Westchester and State of New York, have made a certain new and useful Invention Relating to Finish-Removing Processes, of which the following is a specification.

This invention relates to finish removing processes and relates especially to processes of removing finish, such as paint, varnish and so forth, by applying thereto aqueous solutions of solid, substantially fixed, neutral organic bodies constituting non-inflammable removers.

A number of solid, substantially fixed neutral organic bodies have valuable finish removing properties when in aqueous solution, such bodies being, for example, chloral hydrate, butyl chloral hydrate and similar bodies, as well as strong solutions of sodium, potassium or ammonium salicylates, benzoates, cinnamates, the ammonium bodies being more active in most cases. These solid bodies are substantially fixed, that is, they evaporate only slowly and are substantially neutral when in aqueous solution, although usually having some slight acidity, developed perhaps by hydrolysis. In many cases, it is desirable to use in connection with the aqueous solutions of these bodies other miscible volatile finish solvents, such, for example, as methyl, ethyl, and other alcohols, acetone, and other ketones and the like, these bodies usually promoting the aqueous solution of the solid organic bodies mentioned and increasing the penetrating action on the finish.

In case it is desired to incorporate water immiscible finish solvents, such, for example, as benzol and other solvents of this character, the remover may be made up in emulsion form by the use of a suitable emulsifier of any desired character.

Suitable stiffening material may be incorporated in these removers to give body thereto and to retard the evaporation of the liquid ingredients to the desired extent, such, for example, as soapy, fatty, or waxy material, the sulfoleates being especially desirable in this class of removers. Finely divided stiffening material may also be used, such as wood flour, starch, magnesia, or monoxid of silicon which is an especially light and desirable stiffening material formed in the electrolytic furnace.

Although the scope of this invention is not necessarily limited thereto, a suitable illustrative remover of this character may comprise chloral hydrate 8 pounds, ammonium sulfricinoleate 4 ounces, one gallon of water, 2 pounds of wood flour, ½ pound of sodium salicylate.

Another illustrative remover may be prepared by boiling together ½ pound beeswax, 1 ounce of caustic soda, 1 quart of water until well incorporated and adding thereto oleic acid to the extent of one or two ounces to neutralize any marked excess of alkali. The mixture is then diluted with hot water to a volume of 1 gallon and 6 pounds of chloral hydrate and 1 pound of ammonium benzoate dissolved therein. The composition should be well stirred while cooling.

Another illustrative remover may comprise the solution of 8 to 12 pounds of chloral hydrate in a gallon of water thickened with 5 pounds of wood flour.

Another illustrative remover may comprise 10 pounds of chloral hydrate and 2 pounds of ammonium salicylate dissolved in 1 gallon of water to which has been added a quart of wood alcohol. This remover may be thickened to the desired extent by the incorporation, for example, of monoxid of silicon 2 ounces, and light magnesia 1 pound.

A suitable illustrative remover for use on varnish coatings may comprise 8 pounds of chloral hydrate dissolved in one gallon of water and thickened, if desired, by the incorporation of 4 ounces of common sodium soap with the aid of heat, the soap effectually neutralizing any acid tendency that may occur in the mixture due to hydrolysis.

In applying this remover, a layer of the desired thickness may be spread over the finish to be removed and the neutral substantially fixed organic finish solvent bodies act upon the finish, causing a corrugation or ruffling up of the surface of ordinary varnish finish and the continued action of the remover soon softens the finish so that it may be readily removed from the supporting surface. The non-inflammable properties of these removers are, of course, very valuable, since even if some considerable proportion of volatile inflammable material is incorporated, the mixture as a whole does not give off any inflammable or explosive vapors. For tank work, of course, these removers operate very well, since practically no evaporation occurs and the articles may be dipped into the remover and the finish removed from them without any staining or similar undesirable action upon the wood beneath.

Having described this invention in connection with a number of illustrative ingredients, formulas and methods of operation, to the details of which disclosure the invention is not, of course, to be limited, what is claimed as new and what is desired to be secured by Letters Patent is set forth in the appended claims:

1. The finish removing process which consists in immersing a finished article in an aqueous solution of solid crystallizable substantially fixed neutral organic solvent bodies and allowing such remover to act until it has ruffled up the finish and softened and loosened the same and in withdrawing the article from the remover and removing the finish therefrom.

2. The finish removing process which consists in applying to a finished surface remover consisting essentially of an aqueous solution of solid substantially fixed, neutral organic solvent bodies comprising chloral hydrate, and allowing such remover to act upon the finish until it has softened and loosened the same by the action of said organic bodies thereon while the evaporation of the remover is prevented by the incorporated evaporation retarding material, and in removing the finish from the supporting surface.

3. The finish removing process which consists in applying to a varnished surface a remover comprising an aqueous solution of chloral hydrate and sodium salicylate, and allowing said remover to act on the surface until the varnish is ruffled and softened by the action of the organic bodies thereon, and in removing the varnish from the supporting surface.

4. The finish removing process consisting in applying to a varnished surface a non-inflammable remover comprising an aqueous solution comprising chloral hydrate and allowing the remover to act until the varnish is softened and in removing the same.

5. The finish removing process consisting in applying to a surface a somewhat fluent non-inflammable remover comprising solid crystallizable substantially fixed neutral organic solvent bodies and thereby softening the finish and in removing the same.

6. The finish removing process consisting in applying to a finished surface remover consisting essentially of an aqueous solution of neutral solid crystallizable substantially fixed organic solvent bodies capable of softening the finish and in subsequently removing the softened finish.

7. The finish removing process which consists in applying to a finished surface a non-inflammable aqueous solution comprising chloral hydrate and a salicylate, and allowing the remover to act on the finish until it has ruffled and softened the same, and in removing the finish from the supporting surface.

CARLETON ELLIS.

Witnesses:
HARRY L. DUNCAN,
JESSIE B. KAY.